March 15, 1966   J. A. EBY   3,241,023
MOTOR SPEED CONTROL
Filed March 16, 1962   2 Sheets-Sheet 1

INVENTOR
JAMES A. EBY

BY *Hurvitz & Rose*
ATTORNEY

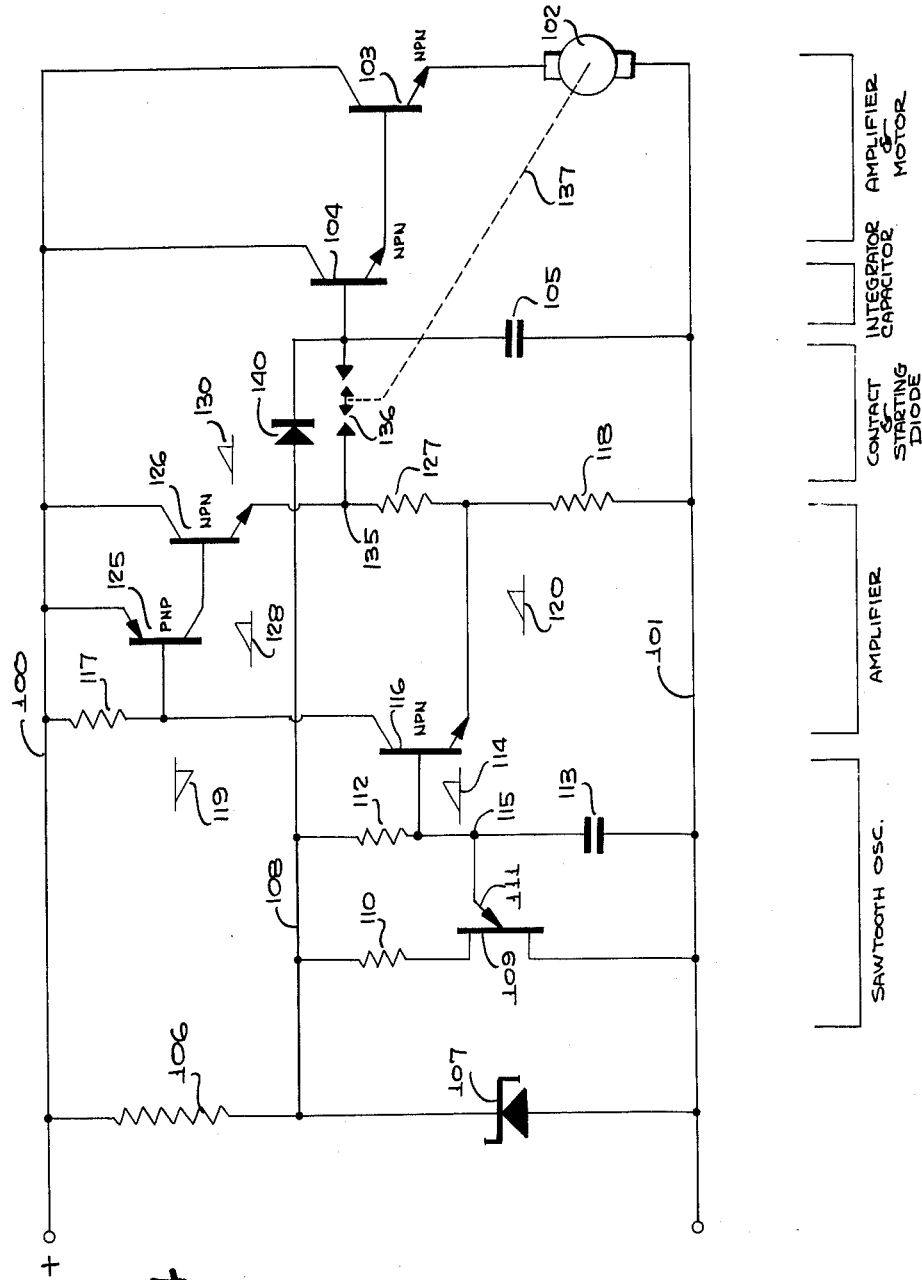

United States Patent Office 3,241,023
Patented Mar. 15, 1966

3,241,023
MOTOR SPEED CONTROL
James A. Eby, Pennington, N.J., assignor to Fifth Dimension Inc., Princeton, N.J., a corporation of New Jersey
Filed Mar. 16, 1962, Ser. No. 180,112
13 Claims. (Cl. 318—314)

The present invention relates generally to methods of and apparatus for controlling the speed of periodically moving objects, such as electric motors, and more particularly to systems of motor control wherein the rotations of a shaft are synchronized with periodic wave shapes.

Briefly describing a preferred embodiment of the present invention, one or more sampling pulses is generated in response to rotation of the shaft of a motor. A source of sawtooth oscillations is provided as a sync source. Each sampling pulse samples the instantaneous amplitude of a sawtooth, providing sampled pulses having amplitudes dependent on the time position of the sampling pulse with respect to the period of the sawtooth. The sampled pulses are integrated and employed to control the speed of the motor. Speed control may be of various kinds, i.e. by control of armature current, shunt field current, or the like.

The sawtooth generator provides a linearly varying refrence signal, and the system is normally so adjusted and designed that sampling occurs near the center of each sawtooth wave for each sampling pulse. Thereby variations of speed either below or above correct value are accompanied by proportionate changes of sampled pulse amplitude. Should speed be synchronous, the sampling pulses will travel along the sawtooth. Assuming that the motor speed is low, the sampling pulse will gradually increase, increasing motor current which implies higher motor speed. The use of sawtooth wave forms is advantageous because it provides maximum linear variation of sampled pulse amplitude. However, a further advantage is that if the sampling pulse rides off the sawtooth for any reason, it promptly encounters a further sawtooth of unchanged slope and therefore of proper slope to effect continued speed corrective action. This is not true where sinusoidal wave forms are employed or sync signals or other wave forms having two slopes of opposite sign.

In the preceding description, reference has been made to use of a sawtooth wave form as a synchronizing signal source. However, the principle of the invention does not require a linear sawtooth wave form, but rather a wave form which does not reverse its slope except during rapid transition sfrom one period to the next, which are not useful, but cannot be avoided. The useful slope may be non-linear, may include portions of zero slope, and may include sharp transitions of slope. The use of the term "sawtooth" is intended to encompass the range of slope types hereinabove suggested.

It is, accordingly, a broad object of the present invention to provide an improved system of motor synchronization.

It is another object of the invention to provide a system for synchronizing motor speed by reference to a periodic sawtooth wave form.

In order to bring a motor up to approximately synchronous speed, so that it may be locked into the synchronizing system of the invention, provision may be made for applying to the motor a voltage representative of the average D.C. content of the sawtooth synchronizing wave form, which is approximately equal to the average D.C. input requirement of the motor at desired speed. Motor starting may be achieved by providing a source of fixed voltage, and connecting the source to the motor control circuit through a diode, which then serves to isolate the integrator circuit against flow of integrated charge out of the integrator once the motor is started. Clearly, however, the motor may be hand started, so that in a broad sense the invention concerns itself with synchronization, rather than with starting.

The system of the present invention is phase sensitive, i.e. corrective action occurs when the speed of the motor is incorrectly phased with respect to time position along the sawtooth reference wave form. It is then a feature and advantage of the invention that phase synchronization occurs identically for all motor speeds and for all degrees of phase asynchronism, because of the linear character of the synchronizing wave form. Stated otherwise, the speed of the motor can be adjusted to have any desired value, within limits, by varying the frequency of the synchronizing wave, and at that value the change of motor current per degree of phase asynchronism will be substantially the same. This feature facilitates avoidance of hunting, and enables minimization of the time required to attain synchronism, from a condition of asynchronism.

It is still another object of the invention to provide a fully transistorized system of motor speed control.

The above and still further objects, features and advantages of the present invention will become apparent upon consideration of the following detailed description of one specific embodiment therof, especially when taken in conjunction with the accompanying drawings, wherein:

FIGURE 4 is a schematic circuit diagram of a modification of the system of FIGURE 2, having provision for automatic starting.

Figure 3:
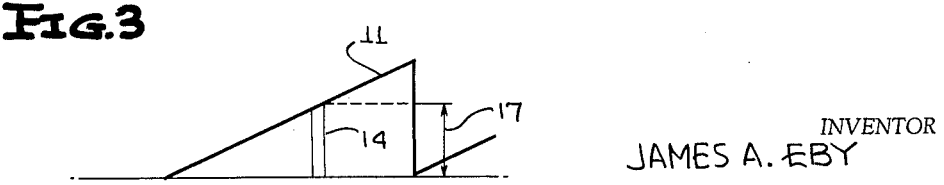
FIGURE 3 is an expanded view of a sawtooth wave and sampling pulse, employed in the invention.

Referring now to the drawings, the reference numeral 10 denotes a source of synchronizing signals, 11, of sawtooth wave form, and having constant peak amplitudes. A D.C. motor 12 activates a commutator 13, or the like, to generate a short pulse 14 for each rotation of the motor shaft. The duration of each pulse 14 is much smaller than the duration of each sawtooth cycle of signals 11. The pulses 14 and the sawtooth waves 11 are applied to a comparator 15, having the function of sampling the amplitude of each sawtooth cycle during the time of each pulse 14, providing output pulses on lead 16 having amplitude, as 17 (FIG. 3). The output of comparator 16 is integrated in integrator 18, providing a D.C. signal of amplitude representative of the time position of pulses 14 relative to wave form 11. By suitably selecting integration time, the output of integrator 18, amplified in isolating and impedance matching amplifier 19, may consist essentially or approximately of step waves 20, each having an amplitude suitable for correcting the speed of motor 12. To this end integration time may approximate the period of waves 11.

It is however, within the scope of the invention to provide longer integration times, smoothing the waves 20, and providing a smoother correction, especially since motor 12 may be expected to have considerable inertia, and hence to possess integrating characteristics in itself.

Figure 1:
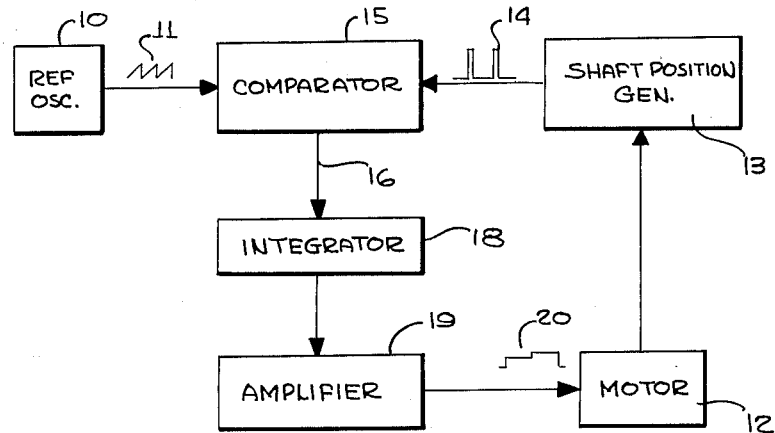
FIGURE 1 is a block diagram of a system according to the invention.
Figure 2:
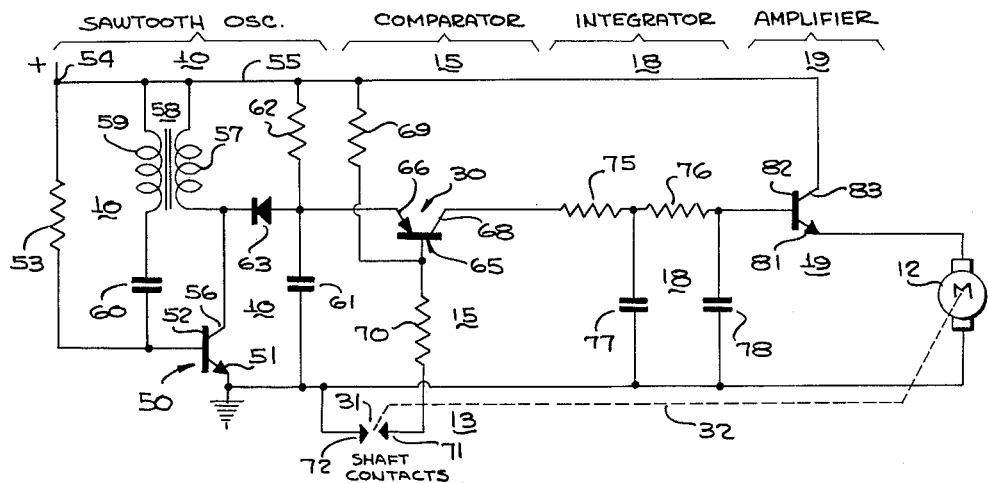
FIGURE 2 is a schematic circuit diagram of the system of FIGURE 1.

Referring now to FIGURE 2 of the accompanying drawings, the reference numeral 10 denotes a reference sawtooth oscillator, transistor 30 and associated circuitry denotes a comparator 15, contacts 31 on the shaft 32 of D.C. motor 12 represents a shaft position generator 13, 18 represents an integrator and 19 an isolating and impedance matching amplifier, the output of which controls the speed of motor 12. Accordingly, the schematic circuit diagram of FIGURE 2 corresponds with the block diagram of FIGURE 1, and corresponding parts are identified by identical numerals of reference. In FIGURE 2, the transistor 50 includes a grounded emitter 51, a base 52 connected via a resistance 53 to a positive bias source 54, connected to lead 55, and a collector 56 connected via a winding 57 of transformer 58, to lead 55. A further winding 59, of transformer 58 is connected at one terminal to lead 55, and via a tuning condenser 60 to base 52. The winding 59 and condenser 60, taken in series, provides a resonant circuit at the operating frequency of oscillator 10, and determines that frequency. The transformer 58 is a feedback device between collector 56 and base 52.

Connected between lead 55 and ground is a series circuit consisting of timing capacitor 61 and timing resistance 62. The time constant of the combination is appropriate to the frequency of oscillator 10. Capacitor 61 is connected between ground, or emitter 51, and collector 56, via a diode 63, poled to permit discharge of capacitor 61 through collector 56, but to prevent flow of current from winding 57 into capacitor 61.

In essence then, capacitor 61 is discharged through transistor 50 and diodes 63 each time that the potential on base 52 attains a value such as to render transistor 50 conductive, and the latter events occur periodically under control of oscillations in circuit 59, 60. Resistance 62 permits capacitor 61 to regain its charge gradually, and thereafter permits a slow reasonably linear rise in charge, essentially according to the wave forms 11.

The transistor 30 includes an emitter 66, a base 65 and a collector 68. Emitter 66 is connected directly to capacitor 61, which imparts its voltage thereto. Base 65 is connected to lead 55 via a bias resistance 69, but is also connected via a resistance 70 to a contact 71. A cooperating contact 72 is connected to ground. The contacts 71, 72 are closed preferably once for each rotation of shaft 32 of motor 12, and this action occurs for a short time (see pulse 14) relative to the duration of each sawtooth wave form. During closure of contacts 71, 72 the bias voltage on base 65 is reduced and transistor 30 becomes momentarily conductive, permitting transfer of charge between the integrator 18 and the capacitor 61.

The integrator 18 is conventional, per se, consisting of series resistances 75, 76 and shunt storage capacitors 77, 78, and is connected in cascade with the base of a power amplifier transistor 19, having an emitter 81, base 82, and a collector 83, the latter connected directly to lead 55. The emitter 81 of transistor 19 is connected in series with the armature of motor 12, and the transistor 19 controls current flow to this armature.

The base 82 and the emitter 81 of transistor 19 provide a high impedance input circuit. Therefore the right hand side of integrator 18 always sees a high impedance, for matching purposes. The left hand side of integrator 18, being connected to collector 68, sees an infinite impedance while transistor 30 is cut-off, provided collector voltage is below emitter voltage. When transistor 30 is rendered conductive by reduction of bias on its base 65, on closure of contacts 71, 72, current can flow to integrator 18 from capacitor 61. If at that time the potential at collector 68 is less than that at emitter 66 (pulse 14) charge will be transferred from capacitor 61 to capacitor 77, increasing the potential on base 62. If the potential on capacitor 77 is greater than that on capacitor 61, when sampling occurs, on the other hand, transfer of charge from capacitor 77 into capacitor 61 can take place because the transistor 30 conducts out of collector 68 acting as an emitter, and emitter 66 acting as a collector.

The integrator 18 can then be replenished from capacitor 61 or drained.

In effect, then, the system operates by nudging the speed of motor 12 upwardly whenever its speed decreases below the speed set by the contact closures, at 71, 72. If the speed of motor 12 is higher than this speed, the charge in capacitor 78 is drained to a lower charge forcing the speed of motor 12 to decrease until balance is again attained.

In accordance with a modification of the present invention, illustrated in FIGURE 4, motor drive voltage is supplied between positive lead 100 and negative lead 101. D.C. motor 102 is connected between leads 100 and 101 via control transistor 103, motor 102 being connected as an emitter load, the collector being directly connected to lead 100 and the base being connected directly to the emitter of transistor 104, which controls conductivity, collector to emitter, of transistor 103. The collector of transistor 104 is directly connected to lead 100, and its base is connected to one side of a storage condenser 105, the other side of which is connected to lead 101. Accordingly, the voltage across condenser 105, or its charge, determines the conductivity of transistor 103, and hence the speed of motor 102.

A voltage standard is provided in terms of a resistance 106 connected in series with a Zener diode 107, across leads 100, 101. To the junction of resistance 106 and Zener diode 107 is connected a lead 108, which is established by the Zener diode 107 at a fixed voltage, despite variations of voltage of lead 100, taking lead 101 as a reference.

Connected between lead 108 and lead 101 is a unijunction transistor 109, in series with a protective or current limiting resistance 110. The emitter 111 of unijunction transistor 109 is connected to the junction of series connected resistance 112 and condenser 113, which form a charging circuit connected between leads 108 and 101. In operation, the condenser 113 charges slowly through resistance 112, until a critical voltage value is reached at control electrode 111, at which time condenser 113 rapidly discharges through transistor 109. A positively going sawtooth voltage wave form 114 is thereby generated at the junction 115 of resistance 112 and condenser 113. The sawtooth wave form 114 is applied to the base electrode of an NPN transistor 116, which is collector loaded by resistance 117 and emitter loaded by resistance 118. By virtue of the loading the collector voltage decreases, as wave shape 119, while emitter voltage increases, as wave shape 120, in response to wave shape 114.

The voltage at the collector of NPN transistor 116 is applied to the base of a PNP transistor 125 having its emitter connected to lead 100 and its collector to the base of NPN transistor 126. The latter has its collector connected to lead 100 and its emitter loaded by the resistances 127, 118 in series. Transistor 125 provides a phase reversal, as at wave form 128, whereby the wave form 130 at the emitter of NPN transistor 126 is co-phasal with the wave form 114. 116, 125 and 126 form a feedback controlled amplifier whose gain is established by the ratio of 127 and 118 to 118.

Point 35 is connected via switch 136 to condenser 105, switch 136 being repetitively opened and closed preferably once for each rotation of the shaft of motor 102, represented at 137. Closure time of switch 136 is very short, in comparison with open time, and for normal speed range of motor 102 the closures occur once for each sawtooth wave form. Thereby, the sawtooth wave forms are sampled, as in FIGURE 3, repetitively, and a voltage representative of the sampled points on the sawtooth wave forms transferred to and stored in condenser 105. The latter then assumes a voltage during each rotation of shaft 137 which depends on the relative speed and phase of motor shaft 137 and the reference sawtooth wave forms. Since the voltage across condenser 105 determines motor speed, a servo loop is established which locks motor speed and phase to the sawtooth wave forms 114.

The problem arises of starting the motor 102 from full stop. For this purpose a diode 140 is connected between lead 108 and condenser 105. The diode 140 is poled to conduct positive charge to condenser 105, and the voltage provided is accurately set by Zener diode 107, to correspond with a desired speed of motor 102. Once the motor has made even a single revolution, a closure of switch 136 is accomplished and the servo process takes over. The diode 140 and Zener reference diode 107 now establish a desired minimum speed for motor 102 since the voltage on condenser 105 cannot fall below that equal to the voltage of Zener diode 107. Increase of voltage on condenser 105, above the reference value, can occur, due to the polarity of diode 140. Clearly, the desired speed, set by the motor start circuit, including Zener diode 107, may be near synchronous speed.

While I have described and illustrated one specific embodiment of my invention, it will be clear that variations of the details of construction which are specifically illustrated and described may be resorted to without departing from the true spirit and scope of the invention as defined in the appended claims.

What is claimed is:

1. In combination, a sawtooth wave generator including a capacitor and means for periodically slowly charging said capacitor and rapidly discharging said capacitor, a first transistor including first emitter, base and collector, means connecting said capacitor between said first emitter and a point of reference potential, means for alternately varying the voltage of said first base and said point of reference potential sufficiently to switch said first transistor off and on in alternation, a passive integrator connected as one input circuit between said first collector and said point of reference potential, a further transistor having a further base, emitter and collector, said passive integrator being connected as an input circuit between said further base and said point of reference potential, a source of supply voltage connected to said further collector, and a motor load connected between said further emitter and said point of reference potential.

2. In a synchronization system for an electric motor having a rotary element, a source of periodic synchronizing waves of sawtooth form, a switch actuable to closed position for a time small with respect to the period of said waves in response to each rotation of said rotary element, means responsive to each closure of said switch for sampling one of said waves, thereby deriving a sampled pulse having an amplitude representative of relative phase of synchronizing waves and motor rotation, means for lengthening each of said sampled pulses to at least approximately the period of said waves and a speed control circuit for said motor responsive to the lengthened pulses.

3. The combination according to claim 2 wherein said source is an oscillator.

4. The combination according to claim 2 wherein said speed control circuit comprises a transistor in series with a speed control element of said motors.

5. The combination according to claim 2 wherein said speed control circuit is a transistor having an emitter, a collector and a base and connected in the emitter follower configuration and having a speed control element of said motor as its load.

6. The combination according to claim 5 wherein said means responsive to closure of said switch comprises a further normally cut-off transistor, said further transistor having a further base, emitter and collector, a source of bias voltage connected to the collector of said first collector, said means for lengthening being an integrator connected between said base of said first transistor and said further collector, means applying said synchonizing waves to said further emitter, and means responsive to closure of said switch for placing said further normally cut-off transistor in conductive condition.

7. In a motor synchronizing system, a source of periodic synchronizing wave forms having a relatively long monotonically amplitude varying portion and a relatively short return portion, a motor, means responsive to said motor for generating recurrent sampling pulses short relative to the period of said wave forms for sampling the amplitudes of said wave forms, integrator means responsive to said sampled amplitudes of said wave forms for generating integrated control voltage levels representative of desired motor phase, and means responsive to said control voltage levels for maintaining phase and speed synchronism of said motor with said periodic synchronizing wave forms, said sampling pulses occurring at fixed phases relative to motor rotation and sampling the substantially instantaneous amplitudes of said monotonically amplitude varying portions of said wave forms.

8. The combination according to claim 7 wherein is further provided means for bringing said motor to near synchonous condition from a stopped condition.

9. The combination according to claim 7 wherein the voltage levels intermediate each pair of samplings remains substantially constant.

10. In a motor control circuit, a source of reference sawtooth voltage waves having relatively long monotonic rise time and negligibly short decay times, a direct current motor, means responsive to each rotation of said motor for generating a negligibly short reference pulse representing phase of motor rotation, comparison means responsive to each of said reference pulses for sampling the amplitude of one of said sawtooth voltage waves to derive a control voltage pulse of amplitude representative of the relative phases of said reference pulse and said sawtooth voltage, means for lengthening said control pulses for times at least approximately equal to the periods of said sawtooth voltage waves, and means responsive to the lengthened control voltage pulses for controlling the direct current applied to and thereby the speed of said motor.

11. The combination according to claim 10 wherein said comparator means includes a switching transistor having a base, means applying said reference pulses to said base for switching on said transistor, said transistor being normally switched off, said source of reference sawtooth voltage waves including a storage capacitor sustaining said voltage waves, said means for lengthening said control voltage pulses including a further capacitor, said transistor including an emitter and a collector, one of said capacitors being connected to said emitter and the other of said capacitors being connected to said collector, whereby the voltages of said capacitors equalize when said transistor is switched on regardless of the relative amplitudes of the voltages of said capacitors.

12. The combination according to claim 10, wherein is provided a speed control capacitor, means for storing in said speed control capacitor for each of said reference sawtooth voltage waves a charge having amplitude representative of the amplitude of said each of said waves at the time of said short reference pulse, the voltages across said speed control capacitor being control voltage pulses.

13. The combination according to claim 12 wherein is provided a source of reference voltage, a diode circuit connecting said source of reference voltage to said speed control capacitor, said reference voltage at said speed control capacitor representing a minimum speed for said motor, whereby said motor is automatically brought to said minimum speed at start-up of said motor and is maintained at at least said minimum speed thereafter.

References Cited by the Examiner

UNITED STATES PATENTS

| | | | |
|---|---|---|---|
| 2,782,355 | 2/1957 | Wilcox | 318—318 X |
| 2,859,360 | 11/1958 | Suran | 331—111 |
| 2,932,778 | 4/1960 | Curtis | 318—314 |
| 3,008,075 | 11/1961 | Scott | 318—318 X |

FOREIGN PATENTS 232,398  11/1960  Australia.

ORIS L. RADER, *Primary Examiner.*